United States Patent [19]
van Etteger

[11] 4,426,708
[45] Jan. 17, 1984

[54] LASER DEVICE

[75] Inventor: Albert F. van Etteger, Nijmegen, Netherlands

[73] Assignee: Stichting Research en Techniek van de Katholieke Universiteit, Netherlands

[21] Appl. No.: 298,798

[22] Filed: Sep. 2, 1981

[30] Foreign Application Priority Data

Sep. 5, 1980 [NL] Netherlands ............... 8005038

[51] Int. Cl.³ .............................................. H01S 3/08
[52] U.S. Cl. .................................. 372/103; 372/99; 372/101; 350/288; 350/319
[58] Field of Search ............... 372/103, 98, 99, 101; 350/288, 319

[56] References Cited

U.S. PATENT DOCUMENTS

| | | | |
|---|---|---|---|
| 3,555,450 | 1/1971 | Rockwell, Jr. ................ | 350/319 |
| 3,717,823 | 1/1973 | Abdale et al. ................. | 372/103 |
| 3,986,141 | 10/1976 | Bulthuis et al. ............... | 372/103 |
| 4,052,681 | 10/1977 | Bulthuis et al. ............... | 372/103 |
| 4,064,466 | 12/1977 | Seki et al. .................... | 372/103 |
| 4,233,568 | 11/1980 | Hamerdinger ................ | 372/103 |
| 4,240,046 | 12/1980 | Kolb, Jr. et al. .............. | 372/103 |

*Primary Examiner*—James W. Davie
*Assistant Examiner*—Leon Jr. Scott
*Attorney, Agent, or Firm*—Scully, Scott, Murphy & Presser

[57] ABSTRACT

Laser device comprising a tube for gaseous or vaporous laser material, which tube is sealed at both ends by a window consisting of a plate of radiation-transmissive material. Each window plate rests directly on the associated end face of the tube and is held against this end face by a retaining frame surrounding the window plate and secured to the end face of the tube. The retaining frame has its surface remote from the end face provided with a flange extending inwardly to overlie the periphery of the window plate and has its surface facing the end face provided with a recess located at its inner edge surrounding the side edge of the window plate. An O-ring is received in the recess.

2 Claims, 3 Drawing Figures

LASER DEVICE

The invention relates to a laser device comprising a tubular cavity containing a gaseous or vaporous material capable of exhibiting laser activity, which cavity is provided at both ends with a window consisting essentially of a plate of suitable, radiation-transmissive material, each window being sealingly secured by means of an O-ring to the respective end face of the cavity so as to seal this cavity.

Such a device is known from e.g. Dutch patent application No. 7400338. In particular, this publication discloses in FIG. 11 a structure employing O-rings for sealing purposes. In prior art devices using O-rings for such purposes, the O-ring bears against a major surface of the window plate.

It is an object of the invention to improve the prior art device. This object is achieved by means of a laser device in which the radiation-transmissive plate of each window rests directly on the associated end face of the cavity and is held against this end face by a retaining means in the form of a frame surrounding the window plate and secured by suitable attaching means to the end face of the cavity, which frame has its surface remote from this end face provided with a flange extending inwardly to overlie the periphery of the window plate and has its surface facing this end face provided with a recess located at its inner edge surrounding the side edge of the window plate, which recess is adapted to receive the O-ring.

An advantage of the device according to the invention is that the O-ring does not bear against a major surface of the window plate but against the side edge thereof. As a result, a larger portion of the area of the plate can be used for the transmission of laser radiation, which means that the same useful area can be obtained with a smaller plate. In view of the costliness of the material normally used for window plates (often semiconductor material such as ZnSe, CdTe, GaAs, Ge), such optimal use of the window material constitutes an economic advantage. In addition, the device according to the invention appears to have a mechanical stability greater than that of the prior art devices. It is believed that these better qualifications of the laser device according to the invention as compared to prior art lasers may be explained as follows. In the prior art devices the window plate essentially rests on the O-ring and this O-ring is kept compressed by the window plate against the end face of the cavity or in a groove provided in this end face. Even if the window plates are kept well pressed down, pressure variations that may occur in the system can result in these plates performing slight upward and downward movements on the elastic O-ring. Such movements result in variations in the dimensions of the cavity. When using so-called Brewster windows, variations in the angle at which the window is mounted may be the result of these movements. Such variations in dimensions and/or angle have an adverse effect on the operation of the laser device. In the device according to the invention the occurrence of such variations is virtually impossible.

It is observed that the occurrence of the variations in question due to movements of the window on the O-ring is absent in laser devices in which no O-rings are employed but the window plates are cemented to the device instead. Such devices are known from e.g. Dutch patent application No. 7502973. A drawback inherent in such devices is, however, that the windows are not detachable and can therefore not be readily replaced in the event of failure.

In a suitable embodiment of the laser device according to the invention the recess is dimensioned so that the O-ring fills at least 90% of the volume of the recess. For determining such a filling factor, the O-ring is assumed to have a maximum compression of 3% and a maximum elongation of 6%. The device according to the invention has been found to function optimally at a filling factor of at least 90%.

The further structure of the device according to the invention may be of conventional design and is known to the worker in the art. The same applies to the composition of the laser medium and the manner of operating the device. The invention has been found to be particularly suited for use in so-called $CO_2$ lasers.

The invention will be described in greater detail with reference to the accompanying drawings, in which.

Figure 1:
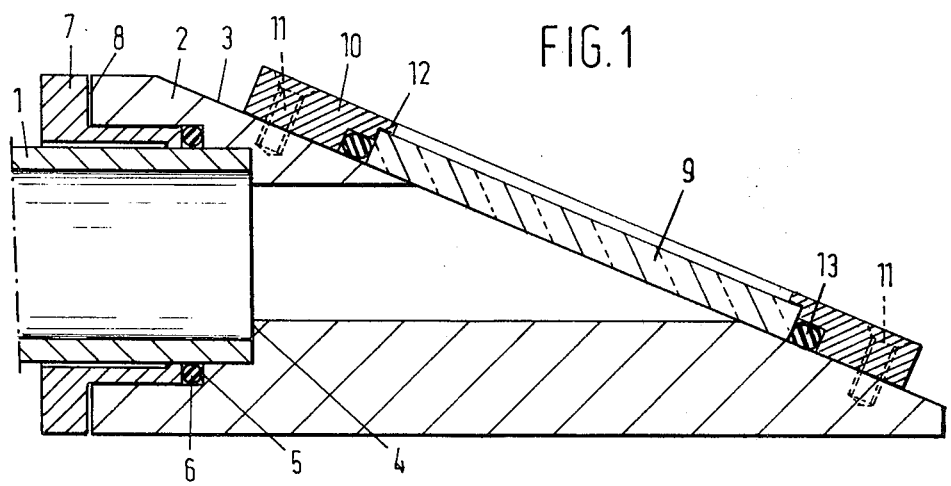
FIG. 1 shows a cross-sectional view of the end section of a laser device according to the invention.

FIG. 1 shows the end section of a Brewster window type laser device to which the invention is applied. The end piece 2 having a bevelled end face 3 is slid over the end of the actual laser tube 1. The end piece 2 is beam shaped and has its end remote from the laser tube 1 provided with a bore of essentially rectangular section. The end piece 2 further has its end facing the laser tube 1 provided with a stepwise tapered cylindrical bore, which bore merges into the rectangular bore so that the end piece 2 is bored end to end. The end of the laser tube 1 abuts the leading edge 4 of the rectangular bore, this edge 4 being the place where the rectangular bore merges into the stepwise tapered cylindrical bore. The part of the cylindrical bore having the smallest diameter fits with a slight amount of play around the outer circumference of the end of tube 1. An O-ring 6 is placed against the leading edge 5 of this smallest diameter part of the cylindrical bore, which O-ring 6 is kept pressed down by a retaining member 7 essentially consisting of a cylindrical portion fitting between the outer wall of tube 1 and the inner wall of the part of the cylindrical bore having the largest inner diameter, and a collar-like portion resting against the leading edge 8 of this largest diameter part of the cylindrical bore.

The window plate 9 of suitable, radiation-transmissive material rests on the bevelled end face 3 of end piece 2. This window plate 9 is kept pressed down on end face 3 by the retaining frame 10 secured by suitable attaching means, for example screws 11, to the end piece 2. The retaining frame 10 has its surface remote from end piece 2 provided with a flange 12 extending inwardly to overlie the outer edge of the major surface of the window plate 9. The retaining frame 10 further has its surface facing end face 2 provided with a recess located at its inner edge surrounding the side edge of the window plate 9, so that a groove is formed between the retaining frame 10 and the window plate 9. An O-ring 13 is received in this groove.

As the plate 9 is kept well pressed down on the end face 3 by the retaining frame 10 and the sealing O-ring 13 surrounds the plate 9 instead of being positioned between this plate and the end piece 2, even in the event of pressure variations occurring in the system this plate 9 will not move, so that neither the dimensions of the total device nor the angle between the plate and the central axis of the device will be subject to variations.

Figure 2:
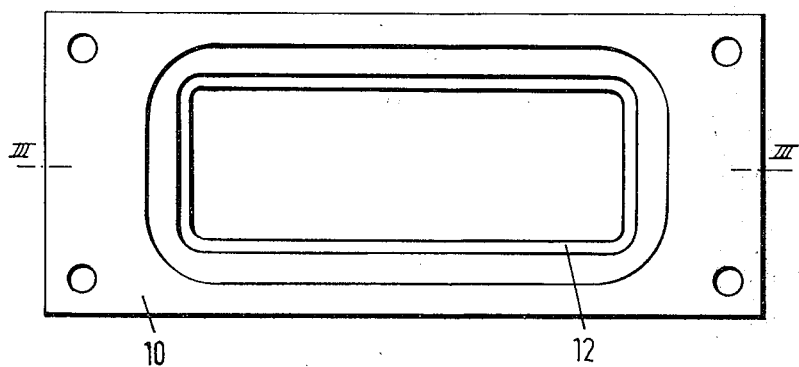
FIG. 2 shows a bottom view of a retaining frame.

FIG. 2 shows a bottom view of an embodiment of the retaining frame 10 that is suited for use with a rectangular window plate. The dimensions of the recess for receiving the O-ring are preferably so that the O-ring fills at least 90% of the recess. In this manner a high quality sealing is achieved.

Figure 3:
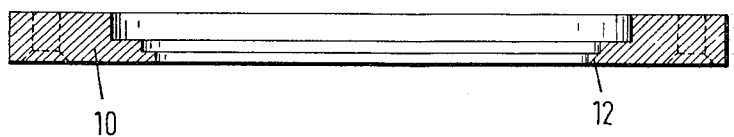
FIG. 3 shows a cross-sectional view of the retaining frame of FIG. 2 along the lines III—III.

FIG. 3 shows a cross-sectional view of the retaining frame of FIG. 2 along the lines III—III. In the figures, corresponding components are designated by corresponding reference numerals.

I claim:

1. A laser device comprising a tubular cavity containing a gaseous or vaporous material capable of exhibiting laser activity, which cavity is provided at both ends with a window consisting essentially of a plate of suitable, radiation-transmissive material, each window being sealingly secured by means of an O-ring to the respective end face of the cavity so as to seal said cavity, characterized in that the radiation-transmissive plate of each window rests directly on the associated end face of said cavity and is held against said end face by a retaining means in the form of a frame surrounding the window plate and secured by suitable attaching means to the end face of the cavity, which frame has its surface remote from said end face provided with a flange extending inwardly to overlie the periphery of the window plate and has its surface facing said end face provided with a recess located at its inner edge surrounding the side edge of the window plate, which recess is adapted to receive said O-ring, such that the O-ring sealingly bears against the side edge of the window plate.

2. A laser device according to claim 1, characterized in that said recess is dimensioned so that said O-ring fills at least 90% of the volume of said recess.

* * * * *